United States Patent [19]

Oltean et al.

[11] Patent Number: 5,520,954
[45] Date of Patent: May 28, 1996

[54] METHOD OF MAKING TRANSPARENT MAGNETIC RECORDING LAYERS

[75] Inventors: George L. Oltean; Robert O. James; Brian S. White, all of Rochester, N.Y.; David B. Bailey, Menlo Park, Calif.

[73] Assignee: Eastman Kodak Company, Rochester, N.Y.

[21] Appl. No.: 401,518

[22] Filed: Mar. 10, 1995

[51] Int. Cl.⁶ ........................................... G11B 5/00
[52] U.S. Cl. .................. 427/128; 252/62.54; 428/323; 428/341; 428/478.2; 428/694 B; 428/900
[58] Field of Search ................... 428/323, 478.2, 428/694 B, 900, 341; 427/128; 252/62.54

[56] References Cited

U.S. PATENT DOCUMENTS

| | | | |
|---|---|---|---|
| 3,850,640 | 11/1974 | Babbitt et al. | 430/528 |
| 4,013,696 | 3/1977 | Babbitt et al. | 428/412 |
| 4,283,476 | 8/1981 | Farnsworth et al. | 430/140 |
| 4,881,246 | 11/1989 | Long | 375/332 |
| 5,009,099 | 4/1991 | Wells et al. | 73/1 |
| 5,009,925 | 4/1991 | Grigat et al. | 427/48 |
| 5,015,498 | 5/1991 | Aonuma et al. | 427/132 |
| 5,102,732 | 4/1992 | Goto et al. | 428/329 |
| 5,147,768 | 9/1992 | Sakakibara et al. | 430/501 |
| 5,229,259 | 7/1993 | Yokota | 430/523 |
| 5,240,626 | 8/1993 | Thakur et al. | 252/62.54 |

FOREIGN PATENT DOCUMENTS

137926A1  4/1985  European Pat. Off. .

*Primary Examiner*—Stevan A. Resan
*Attorney, Agent, or Firm*—Robert A. Gerlach

[57] ABSTRACT

A method of making a transparent magnetic recording layer which comprises forming a concentrated aqueous magnetic dispersion (A) of from 10 to 50 percent by weight ferromagnetic particles having a specific surface area of at least 30 $m^2/gm$ and from 0.5 to 20 percent by weight of a dispersing agent; adding the concentrated aqueous magnetic dispersion (A) to a viscosity increasing hydrophilic polymer in water (B) such that the concentration of the hydrophilic cobinder is from 0.5 to 3 percent by weight based on the total weight of (A) and (B); diluting the resulting dispersion (A) plus (B) with water to give a dispersion (C) having a concentration of from 0.5 to 5 percent by weight of ferromagnetic particles; preparing a final dispersion by adding to the dispersion (C) from 20 to 200 parts per 100 parts of dispersion (C) of an aqueous deionized gelatin solution having a pH value from 7 to 10 and containing from 2 to 15 percent by weight of gelatin and coating the final dispersion onto a substrate to give a dry coverage of from 700 $mg/m^2$ to 3000 $mg/m^2$ of solids.

9 Claims, No Drawings

METHOD OF MAKING TRANSPARENT MAGNETIC RECORDING LAYERS

BACKGROUND OF THE INVENTION

1. Field of the Invention

This invention relates to a method of making an aqueous based magnetic particle dispersion and more particularly to a method of making photographic elements having a transparent magnetic recording layer using an aqueous based dispersion of magnetic particles with gelatin as the major hydrophilic binder.

2. Description of the Related Art

U.S. Pat. No. 5,147,768 contains an example of ferromagnetic particles dispersed in water and then mixed with gelatin to form a final dispersion used to coat a cellulose triacetate film to prepare a transparent magnetic recording layer. A problem exists in such preparations in that it is extremely difficult to prepare uniform dispersions which do not interfere with the photographic properties of photographic elements to which the transparent magnetic recording layer is applied.

It has been found by experimentation that improvements in the quality of the transparent layer can be gained by incorporating into the aqueous ferromagnetic particle dispersion suitable dispersing agents. However, even with the presence of suitable dispersing agents in the aqueous ferromagnetic particle mixture, flocculation of the magnetic particles occur when mixed with gelatin, thereby causing grain in the finished photographic element.

Thus, there is a need to provide aqueous ferromagnetic particle dispersions containing gelatin suitable for making high quality transparent magnetic recording layers that are readily compatible with other gelatin based photographic elements.

SUMMARY OF THE INVENTION

A method of making a transparent magnetic recording layer which comprises forming a concentrated aqueous magnetic dispersion (A) of from 10 to 50 percent by weight ferromagnetic particles having a specific surface area of at least 30 $m^2/gm$ and from 0.5 to 20 percent by weight of a dispersing agent; adding the concentrated aqueous magnetic dispersion (A) to a viscosity increasing hydrophilic polymer in water (B) such that the concentration of the hydrophilic polymer is from 0.5 to 3 percent by weight based on the total weight of (A) and (B); diluting the resulting dispersion (A) plus (B) with water to give a dispersion (C) having a concentration of from 0.5 to 5 percent by weight of ferromagnetic particles; preparing a final dispersion by adding to the dispersion (C) from 20 to 200 parts per 100 parts of dispersion (C) of an aqueous deionized gelatin solution having a pH value from 7 to 10 and containing from 2 to 15 percent by weight of gelatin and coating the final dispersion onto a substrate to give a dry coverage of from 700 $mg/m^2$ to 3000 $mg/m^2$ of solids.

Thus, the invention contemplates the sequence of the four distinct steps set forth to achieve high image quality photographic elements having a transparent magnetic layer with gelatin as its major hydrophilic binder.

DESCRIPTION OF PREFERRED EMBODIMENTS

In the first step of the process of forming an aqueous based ferromagnetic particle dispersion, the ferromagnetic particles are mixed with water and a dispersing agent in a concentration of ferromagnetic particles of from about 10 to about 50 percent by weight. In this step, it is highly preferred that the preparation of the concentrated aqueous magnetic dispersion takes place in a suitable milling device in order to ensure that agglomerates of the ferromagnetic particles are broken up.

Various kneading machines are used for kneading and dispersing the magnetic coating composition; for example, two roll mills, three roll mills, ball mills, pebble mills, trommel mills, sand grinders, Szegvari attriters, high speed impeller dispersing machines, high speed stone mills, high speed small media mills; for example, using steel, ceramic or glass dispersing high speed mixers, homogenizers, ultrasonic machines, and the like. The kneading and dispersing techniques are described in T. C. Patton, "Paint Flow and Pigment Dispersion", published by John Wiley & Sons (1964) and U.S. Pat. Nos. 2,581,414 and 2,855,156.

In this step of the procedure, from 0.5 to 20 percent by weight of a dispersing agent is employed. Suitable dispersing agents include: inorganic and organic phosphates and phosphonates, such as sodium phosphate, disodium hydrogen phosphate, sodium poly phosphates; aminoalkyl phosphonates, and aminoalkyl phosphonic acids including, aminotrismethylene phosphonic acid, and pentasodium aminotrismethylphosphonate, both of which are sold by Monsanto Company under the trade designations, Dequest 2000 and Dequest 2006 respectively; quaternary amine alkylene oxide ether salts, such as, acetate, phosphate and chloride salts as those sold under the trade designation Witco Emcol, CC-55, CC-57, and CC-59, by Witco Company. Alkyl or aryl phosphoric acid mono and diesters having polyethylene oxide functionality such as Rhodofac LO529; RE610, RE960; and RE760 sold by Rhone-Poulenc Inc. The preferred dispersing agent is pentasodium aminotrismethylphosphonate, Dequest 2006.

Any suitable ferromagnetic particle may be employed in the preparation of the concentrated aqueous magnetic dispersion in an amount of from about 10 to 50 percent by weight, such as, for example, ferromagnetic gamma-iron oxides, cobalt surface-treated ferromagnetic iron oxides, cobalt-doped ferromagnetic iron oxides, cobalt containing $Fe_2O_3$, ferromagnetic magnetites, cobalt-containing ferromagnetic magnetites, ferromagnetic chromium dioxides, ferromagnetic metal powders, ferromagnetic iron powders, ferromagnetic alloy powders and the class of ferromagnetic ferrite powders including barium ferrites. Additionally, the above-mentioned powder particles may be modified to provide lower light extinction and scattering coefficients by providing them with a shell, of at least the same volume as the magnetic core, of a low refractive index material that has its refractive index lower than the transparent polymeric material used to form the magnetizable layer. Typical shell materials may include amorphous silica, vitreous silica, glass, calcium fluoride, magnesium, lithium fluoride, polytetrafluoroethylene and fluorinated resins. Examples of the ferromagnetic alloy powders include those comprising at least 75 percent by weight of metals which comprise at least 80 percent by weight of at least one ferromagnetic metal alloy (such as Pe, Co, Ni, Fe—Co, Fe—Nic, Co—Ni, Co—Ni—Fe) and 20 percent or less of other components (such as Al, Si, S, Sc, Ti, V, Cr, Mn, Cu, Zn, Y, Mo, RH, Re, Pd, Ag, SN, B, Ba, Ta, W, Au, Hg, Pb, La, Ce, Pr, Nd, Te, and Bi). The ferromagnetic metals may contain a small amount of water, a hydroxide or an oxide.

The shape and size of the ferromagnetic powder are not particularly limited. The shape may be any needle, rice grain (prolate ellipsoid), spherical, cubic, and tabular shapes.

Among them, the needle and the tabular grains are preferred from the view point of electromagnetic transduction characteristics (magnetic signal and recording performance). On the other hand, small particles of rods, prolate ellipsoids, spheres, and cubic spheres or random alignment of ansiometric particles are preferred on the basis of the scattering of electromagnetic radiation in respect to the extinction and scattering cross-section of the particles and the polarization of light transmitted through the magnetizable layer. The pH of the ferromagnetic powder and the surface-treating agent, therefore, are not particularly limited. Namely, it can be surface treated with a substance containing an element such as titanium, silicon, or aluminum, or with an organic compound such as carboxylic acid, sulfonic acid, sulfuric acid, sulfuric acid ester, phosphoric acid, phosphoric acid ester, organic phosphoric acid anhydride, or an adsorbing compound having a nitrogen-containing heterocyclic ring such as polyvinylpyrrolidone. Additionally, the treated ferromagnetic particles or crystals may be surrounded by a shell of a transparent material about the same volume as the core, in which the refractive index is preferably less than 1.5. Preferred pH ranges from 5 to 10. In the fine powder of ferromagnetic iron oxide and the like, the ratio of iron (II) to iron (III) is not particularly limited; however, it is preferred to be in the range of from 3 to 50 percent by weight.

The amount of the fine ferromagnetic powder is 0.0004 to 3 g, preferably 0.001 to 1 g and more preferably 0.004 to 0.1 g and most preferably 0.01 to 0.08 g, per sq. m. of the transparent support. Any effect on the total optical density of the silver halide and transparent magnetic layer could result in longer printing times. However, this can be compensated for, at least in part, by adjusting the laydown of the masking layer in the silver halide layers. It is possible to keep the optical density of the transparent layer in the range 0.15@450 nm to 0.03@650 nm and below as determined by a spectrophotometer arranged to measure the specular density.

The dispersion in accordance with this step of the invention contains magnetic particles which preferably are acicular or needle like magnetic particles. The average length of these particles along the major axis preferably is less than about 0.3, more preferably, less than about 0.2 micron. The particles preferably exhibit an axial ratio, that is, a length to diameter thickness ratio of up to about 5 or 6 to 1. The particles have a specific surface area of at least 30 $m^2/g$, more preferably of at least 40 $m^2/g$. Typical acicular particles of this type include, for example, particles of ferro and ferro iron oxides such as gammaferric oxide, complex oxides or iron and cobalt, various ferrites and metallic iron pigments. Alternatively, small tabular particles such as barium ferrites and the like can be employed. The particles can be doped with one or more ions of a polyvalent metal such as titanium, tin, cobalt, nickel, zinc, manganese, chromium, or the like as is known in the art. A preferred particle consists of Co surface treated gamma-$Fe_2O_3$ having a specific surface area of greater than 40 $m^2/g$. Particles of this type are commercially available. For good magnetic recording, the magnetic particles preferably exhibit coercive force above 500 Oe (e.g., about 800 Oe) and saturation magnetization above 70 emu/g of iron oxide (not including any shell that may be coated on a magnetic core particle).

A preferred particle consists of Co surface treated γ-$Fe_2O_3$ having a specific surface area of greater than 40 $m^2/g$. Particles of this type are commercially available and can be obtained from Toda Kogyo Corporation under the trade names CSF 4085V2, CSF 4565V, CSF 4585V, and CND 865V, and are available on a production scale from ISK Magnetics Inc. under the trade designations RPX-4392, RPX-5003, RPX-5026, and RPX-5012. For good magnetic recording, the magnetic particles preferably exhibit coercive force above about 500 Oe and saturation magnetization above 70 emu/g.

In the second step of the preparation of the final aqueous magnetic dispersion, a viscosity increasing hydrophilic polymer in water (B) is employed to dilute the concentrated aqueous dispersion (A) as described above. Hydrophilic polymers usable herein are described in Research Disclosure No. 308119 December 1989 and No. 18716 (p. 651) November 1979. Suitable examples include water-soluble polymers, cellulose esters, latex derivatives, casein, agar, sodium alginate, starch, polyvinyl alcohol, polyacrylic acid copolymers and maleic anhydride copolymers; latex polymers including vinyl chloride copolymers, vinylidene chloride copolymers, acrylic ester, copolymers, vinyl acetate copolymers, and butadiene copolymers; poly(vinyl alcohol), poly-(ethylene oxide), polyvinylpyrrolidone, polyacrylamide, methylcellulose, hydroxyethylcellulose, hydroxypropylmethylcellulose, hydroxypropylcellulose, hydroxybutylmethylcellulose, carboxymethylcellulose, and alginic acid. Methylcellulose, hydroxypropylcellulose, and hydroxybutylmethylcellulose are preferred. Methylcellulose is most preferred.

It is preferred to add to the magnetic particle dispersion (A) or (A) plus (B) a polymeric stabilizing agent, such as, copolymers and block copolymers of polyalkylene ether polyols. Suitable polymers include: poly(ethylene glycol) distearate, poly(dimethylsiloxane-co-ethylene oxide), AB block, poly(dimethylsiloxane-co-ethylene oxide), AB block, pluronic block copolymer surfactant, tetronic block copolymer surfactant. The Pluronic, Pluronic R, and Tetronic surfactants, manufactured by BASF Performance Chemicals, have the general structural formulas given below.

Pluronic $$HO-(CH_2CH_2O)_x-(CH_2CHO)_y-(CH_2CH_2O)_x-H$$
$$\phantom{HO-(CH_2CH_2O)_x-(}|\phantom{CH_2CHO)}$$
$$\phantom{HO-(CH_2CH_2O)_x-}CH_3$$

Pluronic R $$HO-(CHCH_2O)_x-(CH_2CH_2O)_y-(CH_2CHO)_x-H$$

with $CH_3$ branches

Tetronic

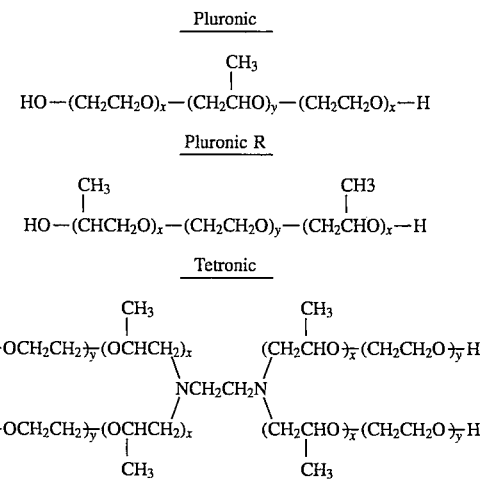

In these formulas, x and y can be determined from the numerical code. The last digit indicates the percentage by weight of hydrophile (polyoxyethylene) units, while the first digit(s) scale with the molecular weight of the hydrophobic (polyoxypropylene) portion of the molecule. For example, Pluronic 10R5 is 50 percent hydrophile, with a hydrophobe molecular wieght of 1000. Hence, the total molecular weight is 2000 g/mol, and the numbers x and y are 8 and 22, respectively.

Graft or "comb" copolymers may also be used as polymeric stabilizing agents. For example, one with a hydrophobic backbone and hydrophilic "teeth". These polymeric agents help stabilize the magnetic particle by adsorbing to the magnetic particle surface and hindering the agglomeration of colliding particles.

The components of the hydrophilic viscosity increasing polymer may be mixed together in a ratio of the hydrophilic polymer to the polyalkylene ether block or copolymer of from 10:1 to 1:10 in an amount of water where the water is present in an amount of from about 80 to about 95 percent based on the entire weight of the mixture and this mixture then used to dilute the concentrated aqueous magnetic dispersion previously discussed whereby the hydrophilic polymer and the polymeric stabilizing agent are present in the mixture with the concentrated aqueous magnetic dispersion in an amount of from 0.5 to 3 percent by weight. While any order of addition may be followed, it is preferred that the polyalkylene ether polyol be first mixed with water and the concentrated aqueous magnetic dispersion added thereto. Following this step, the resulting mixture is added to the hydrophilic viscosity increasing polymer. It is preferred that this step be conducted in a mill such as a media mill wherein the mixture of the polyalkylene ether polyol and the aqueous magnetic dispersion is slowly added. Following this addition, further dilution with water is brought about such that the concentration of the ferromagnetic particles in the resulting dispersion is from 0.5 to 5 percent by weight. Finally, from 20 to 200 parts per 100 parts of the diluted dispersion of an aqueous deionized gelatin solution having a pH of from 7 to 10 and containing 2 to 15 percent by weight of gelatin is added.

Any suitable gelatin may be used, such as alkali-treated (lime treated) gelatin which was immersed in an alkali bath prior to extraction thereof, an acid-treated gelatin which was immersed in both baths and enzyme-treated gelatin. If necessary, gelatin can be used in combination with colloidal albumin, casein, a cellulose derivative (such as carboxymethyl or hydroxyethyl cellulose), agar, sodium alginate, a saccharide derivative (such as a starch derivative or dextran), a synthetic hydrophilic colloid (such as polyvinyl alcohol, poly-N-vinylpyrolidone, a polyacrylic acid copolymer, polyacrylamide, or a derivative or partial hydrolyzate thereof), or a gelatin derivative. Following the addition of the gelatin, it is preferred that the aqueous dispersion be milled to ensure that the composition passes through a five micrometer filter.

This composition is then applied to a suitable support resulting in a transparent magnetic layer capable of storing information magnetically. The aqueous coating compositions in accordance with the above may be coated onto a suitable substrate to give a coverage of 700 mg/m² to about 3000 mg/m² of total solids. Suitable supports include: cellulose acetate and derivatives, such as: cellulose triacetate, cellulose diacetate; polyesters, such as: polyethylene terephthalate, Polyethylene-2,6-naphthalate; polycarbonates, polyamides, polyimides, polyolefins, resin coated photographic paper, low density polyethylene, high density polyethylene.

The invention will be further illustrated by the following examples:

EXAMPLE 1

All the dilute aqueous dispersions are prepared by letdown of a small quantity of a concentrated aqueous magnetic dispersion that was milled in a 250 ml small media mill, loaded with 1.3 mm steel media at 85 percent on a volume basis of the mill chamber for 3 hours at about 3700 rpm and 65 degrees F. The starting composition for this magnetic concentrate is as follows:

| | | |
|---|---|---|
| Magnetic Particle | Toda CSF 4085V2 | 600 g |
| Deionized | Water | 723 g |
| Dispersing Agent | Dequest 2006 | 12 g |
| | Total | 1335 g |

The mill was filled with water, the Dequest 2006 was added to the mill, then the Toda CSF 4085V2 magnetic powder was added slowly to the mill while agitating the slurry contained in the mill funnel that is waiting to be circulated through the mill chamber. Solids, 44.9 percent by weight magnetic oxide. A small portion of this magnetic concentrate was used in Examples 1 through 4. Solutions used were aqueous in all the Examples.

This concentrate magnetic dispersion was letdown to dilute coating solids as follows. First, 160 g of a 10 percent by weight solution of Pluronic block copolymer 17R8 (BASF) was added to a stainless steel beaker. While stirring 13.33 g of the above magnetic concentrate was slowly added to the 10 percent Pluronic 17R8 solution and stirred for at least 10 minutes. Next, 700 g of a 1 percent by weight methyl cellulose solution (Sigma M-0512 viscosity of 2 percent aqueous solution at 25° C.:4000 centipoises) was placed into a clean 250 ml media mill. The mill heating water was set to 90 degrees F, and the mill screw speed set to 2000 rpm. The methyl cellulose solution was slowly stirred while milling. The Pluronic and magnetic concentrate dispersion was then slowly added to the methyl cellulose solution in the mill. Next, 126.5 g of deionized water was slowly added to the mill and the resulting dispersion was milled for 25 minutes. Finally, 1000 g of a 10 percent by weight solution of Type IV deionized cow bone gelatin, which was adjusted to a pH of 9.0 with KOH, was slowly added to the media mill containing the water/methyl cellulose/Pluronic copolymer/magnetic concentrate dispersion. This aqueous dispersion was then milled for another 25 minutes and was passed through a 5 μm filter before coating.

EXAMPLE 2

The same procedures were followed as outlined in Example 1 using the same magnetic concentrate dispersion. Except this time 200 g of a 10 percent by weight Pluronic 10R5 block copolymer was used instead of the 17R8 block copolymer. Also, 767.7 g of a 1.33 percent by weight solution of methyl cellulose was used in place of the 1 percent solution amount. The amount of deionized water used was changed to 110.6 g.

EXAMPLE 3

The same procedures were followed as outlined in Example 1 using the same magnetic concentrate dispersion. Except this time 100 g of a 10 percent by weight Pluronic 25R8 block copolymer was used instead of the 17R8 block copolymer. Also, 600.0 g of a 1.33 percent by weight solution of methyl cellulose was used in place of the 1 percent solution amount. The amount of deionized water used was changed to 286.67 G.

EXAMPLE 4

The same procedures and amount were used as in Example 3 except 10 g of Pluronic 25R8 block copolymer were added as flakes to 13.33 g of the magnetic concentrate diluted with 90 g of deionized water in a media mill and milled for 40 minutes. Then the methyl cellulose and 286.67 g of water were added and milled for 25 minutes. Finally, the pH adjusted Type IV gelatin was added to the media mill and this letdown, coating solids dispersion was milled for an additional 60 minutes and filtered before coating.

EXAMPLE 5

9.4 grams of a 0.85 weight percent solution of methyl cellulose was placed in mortar along with 0.44 grams of deionized water. To this was added 0.15 grams of a magnetic concentrate composed of 39.7 percent by weight magnetic oxide. This mixture was milled with a pestle; then 10 grams of a 10 weight percent pH 9.1 solution of gelatin was added to the motor with further milling.

COMPARATIVE EXAMPLE 6

10 grams of a 10 weight percent pH 9.1 Type IV gelatin solution was placed in a mortar. Next, 12.29 grams of deionized water was added to the mortar with miling by a pestle. To this was added 0.15 grams of a magnetic concentrate composed of 39.7 percent by weight magnetic oxide with milling.

COMPARATIVE EXAMPLE 7

10 grams of a 10 weight percent pH 5.4 Type IV gelatin solution was placed in a mortar. Next, 12.29 grams of a deionized water was added to the mortar with milling by a pestle. To this was added 0.15 grams of a magnetic concentrated composed of 39.7 percent by weight magnetic oxide with milling.

Hand coatings of these aqueous dispersions were done on a small chill block hand drawdown type coater. The coating support was held stationary on the metal chill block via suction, and the block itself was cooled to about 14° C. with water. A small amount of the dispersion was transferred to the support and was immediately drawn down using a coating blade with a spacing of 0.0005 inch. The drawdown was allowed to chill-set on the block for several minutes, then was removed for drying at room temperature.

Examples 1–5 and Comparative Examples 6 and 7 are compared for optical performance with a high quality solvent coated transparent magnetic layer containing the same magnetic particles as described in control Example 7 of U.S. Pat. No. 5,252,441.

Optical density at 390 nm, 540 nm, and 740 nm is measured for each example and compared with the solvent reference coating as described above. Quality factor, a measure of the relative light scattering and extinction of the magnetic particles, for each example is calculated in accordance with the following equation:

Quality Factor =

$$\frac{100 \left( \frac{\text{Abs.}(390 \text{ nm})}{\text{Abs}(740 \text{ nm})} + \frac{\frac{\text{Ref.Abs.}(390 \text{ nm})}{\text{Ref.Abs.}(740 \text{ nm})}}{\frac{\text{Ref.Abs.}(390 \text{ nm})}{\text{Ref.Abs.}(540 \text{ nm})}} - \frac{\text{Abs.}(390 \text{ nm})}{\text{Abs}(540 \text{ nm})} \right)}{2 \left( \frac{\text{Ref.Abs.}(390 \text{ nm})}{\text{Ref.Abs.}(740 \text{ nm})} \right)}$$

where Ref. Abs. refers to the optical density of the solvent coated reference at each wavelength and Abs. refers to the optical density of each Example 1–5 and Comparative Examples 6 and 7. The Quality Factor of the solvent reference coating is 100 by definition.

RESULTS

From the low Quality Factor (QF) of 30 from Example 7 and the agglomeration of magnetic particles visible in the coating, just adding the magnetic concentrate dispersion to gelatin directly does not produce low grain coatings. Example 6 shows that adjusting the pH of the gelatin to 9 improved the aqueous dispersion and gave a coating having a Quality Factor of 37.

By adding the magnetic concentrate dispersion to a methyl cellulose solution first, as in Example 5, further improvement was shown by the Quality Factor of 61.

Finally, in Examples 1 to 4 where both the viscosity building hydrophilic polymer and the polyoxyethylene-polyoxypropylene block copolymers were used along with pH adjusted gelatin, the Quality Factors approached and even exceeded the solvent coated control value of 100. The Quality Factors are shown in Table 1.

TABLE 1

| Example # | Gelatin % | pH | Methyl Cellulose % | Pluronic % (Type) | Magnetic Oxide % | OF |
|---|---|---|---|---|---|---|
| 1 | 5 | 9 | 0.35 | 0.8 (17R8) | 0.3 | 96 |
| 2 | 5 | 9 | 0.45 | 1.0 (10R5) | 0.3 | 76 |
| 3 | 5 | 9 | 0.4 | 0.5 (25R8) | 0.3 | 113 |
| 4 | 5 | 9 | 0.4 | 0.5 (25R8) | 0.3 | 88 |
| 5 | 5 | 9 | 0.4 | 0 | 0.3 | 61 |
| 6 | 5 | 9 | 0 | 0 | 0.3 | 37 |
| 7 | 5 | 5.4 | 0 | 0 | 0.3 | 30 |

Note: Other absorbances such as 450, 550, and 650 nm could be used and give the same value for the Quality Factor, because the equation is based on ratios and not absolute values of the absorbances.

What is claimed is:

1. A method of making a transparent magnetic recording layer which comprises forming a concentrated aqueous magnetic dispersion (A) of from 10 to 50 percent by weight ferromagnetic particles having a specific surface area of at least 30 m$^2$/gm and from 0.5 to 20 percent by weight of a dispersing agent; adding the concentrated aqueous magnetic dispersion (A) to a viscosity increasing hydrophilic polymer in water (B) such that the concentration of the hydrophilic cobinder is from 0.5 to 3 percent by weight based on the total weight of (A) and (B); diluting the resulting dispersion (A) plus (B) with water to give a dispersion (C) having a concentration of from 0.5 to 5 percent by weight of ferromagnetic particles; preparing a final dispersion by adding to the dispersion (C) from 20 to 200 parts per 100 parts of dispersion (C) of an aqueous deionized gelatin solution having a pH value from 7 to 10 and containing from 2 to 15 percent by weight of gelatin and coating the final dispersion onto a substrate to give a dry coverage of from 700 mg/m$^2$ to 3000 mg/m$^2$ of solids.

2. The method of claim 1 wherein the viscosity increasing hydrophilic polymer is methylcellulose, hydroxypropylcellulose, and hydroxybutylmethylcellulose.

3. The method of claim 2 wherein the hydrophilic polymer is methylcellulose.

4. The method of claim 1 wherein a polymeric stabilizing agent is added to the hydrophilic viscosity increasing polymer or to the concentrated aqueous dispersion (A).

5. The method of claim 4 wherein the polymeric stabilizing agent is a copolymer of a polyalkylene ether polyol.

6. The method of claim 5 wherein the copolymer is a block copolymer.

7. The method of claim 6 wherein the copolymer includes blocks of polethylene oxide and polypropylene oxide.

8. The method of claim 5 wherein the hydrophilic viscosity increasing polymer and copolymer of polyalkylene ether polyol are present in a ratio of from 10:1 to 1:10.

9. The method of claim 1 wherein the pH of gelatin solution is from 8–10.

\* \* \* \* \*